Aug. 31, 1954 A. E. ARMSTRONG 2,687,851
TEMPERATURE CONTROL FOR DRIERS AND THE LIKE
Filed Aug. 19, 1949 3 Sheets-Sheet 1

INVENTOR.
Adam Elliott Armstrong
BY
ATTORNEY.

Aug. 31, 1954   A. E. ARMSTRONG   2,687,851
TEMPERATURE CONTROL FOR DRIERS AND THE LIKE
Filed Aug. 19, 1949   3 Sheets-Sheet 2
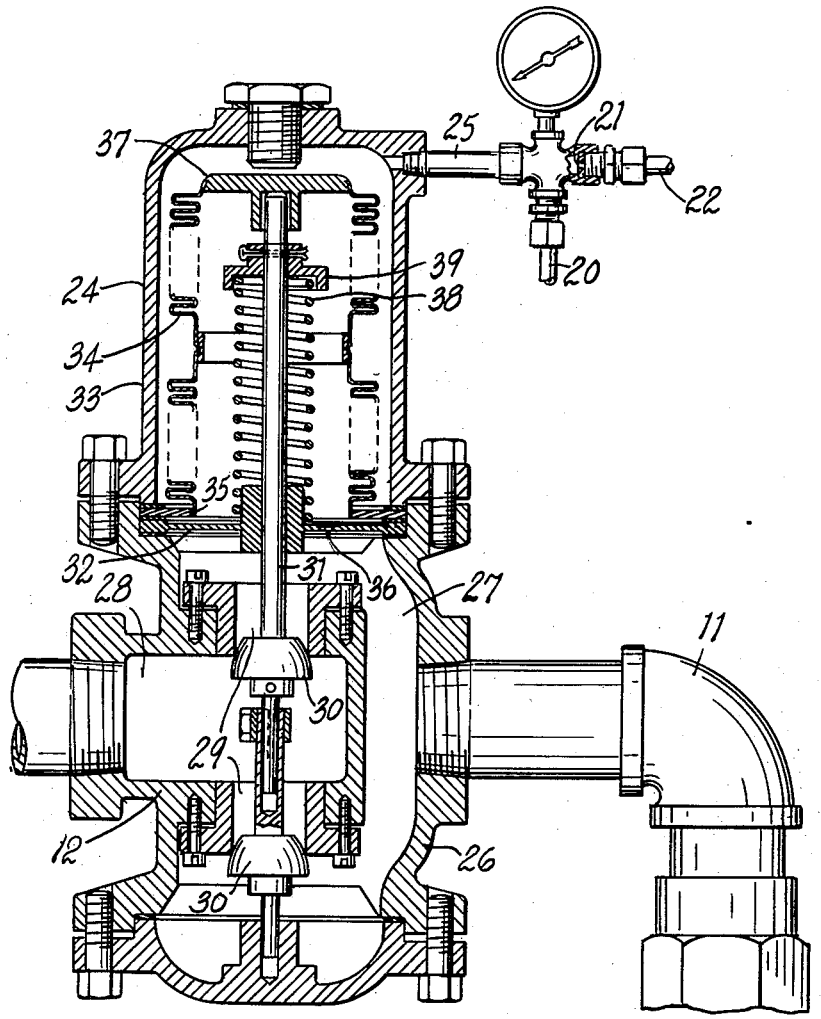
Fig. 2.
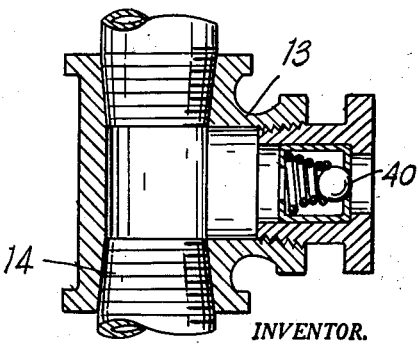
INVENTOR.
Adam Elliott Armstrong
BY
ATTORNEY.

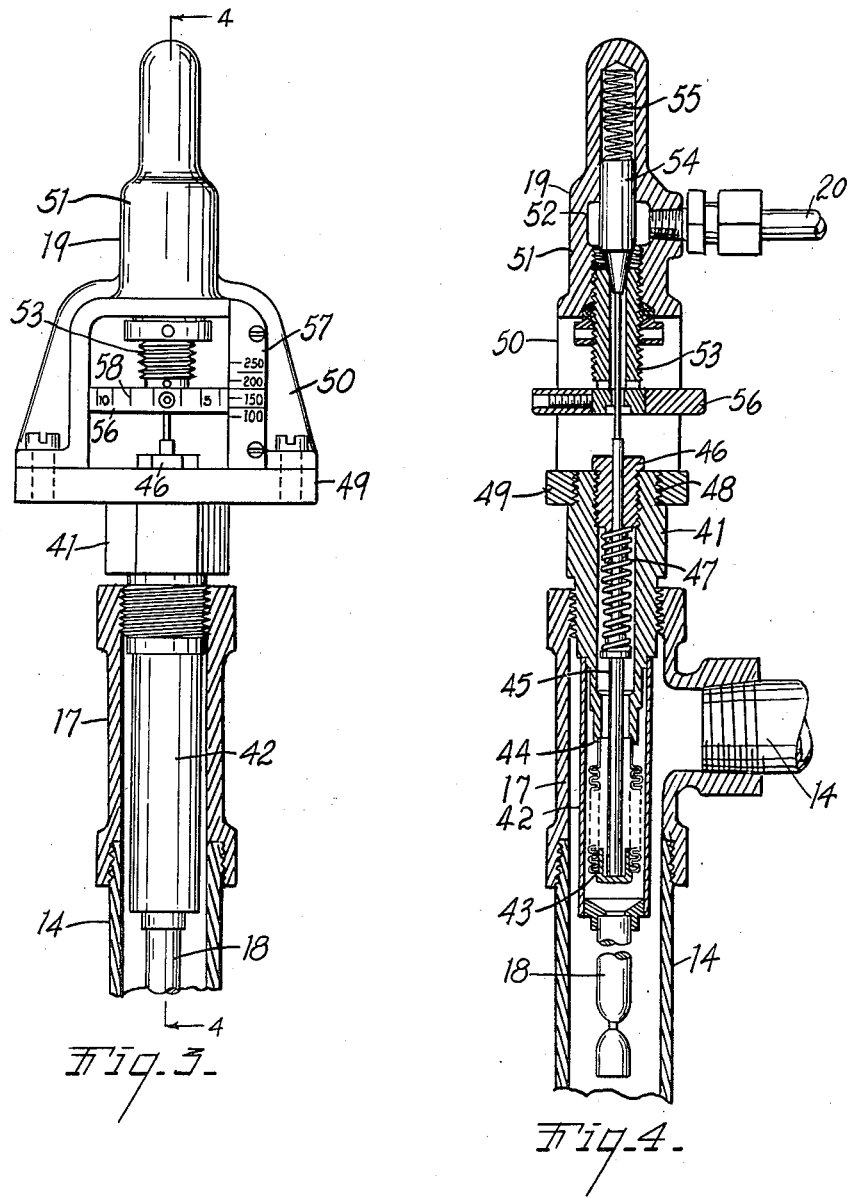

Patented Aug. 31, 1954

2,687,851

UNITED STATES PATENT OFFICE 2,687,851

TEMPERATURE CONTROL FOR DRIERS AND THE LIKE

Adam Elliott Armstrong, Three Rivers, Mich.

Application August 19, 1949, Serial No. 111,320

5 Claims. (Cl. 236—1)

1

This invention relates to improvements in temperature control for driers and the like.

The principal objects of this invention are:

First, to provide novel means for controlling the temperature of rotatable drum-like driers and other enclosures by varying the proportion of steam and air admitted to the drum as a heating medium.

Second, to provide novel temperature responsive mechanism for accurately controlling a throttle valve in the steam supply line of a heating structure.

Third, to provide temperature control mechanism in which an adjustable spring biased thermostatic valve is arranged to control the balancing air pressure on a differential pressure operated steam valve so that the pressure differentials on the steam valve are not large and can be accurately controlled.

Fourth, to provide a temperature control system for a steam heated drying apparatus in which air is introduced into the steam supply automatically under atmospheric pressure depending upon the rate of cooling of the steam and the desired temperature in the drier.

Fifth, to provide a novel and accurately variable throttle valve for the steam supply line to an enclosure the temperature of which is to be controlled.

Sixth, to provide a novel form of temperature responsive valve which is easily adjusted to accurately controllable limits for varying pressure in an enclosure.

Seventh, to provide a temperature control system for a steam heated enclosure which system will accurately maintain the temperature in the enclosure at any pre-selected temperature over a wide range of temperatures both above and below 212° F.

Other objects and advantages of my temperature control system wil be apparent from a consideration of the following description and claims. The drawings of which there are three sheets illustrate a preferred form of my temperature control structure as applied to the rotatable drier roll of a paper making machine.

Fig. 2 is an enlarged fragmentary cross sectional view through the air inlet and steam throttle valves of the system.

Fig. 3 is a fragmentary enlarged elevational view partially in vertical cross section of the temperature responsive air pressure valve illustrated in Fig. 1.

2

Figure 1:
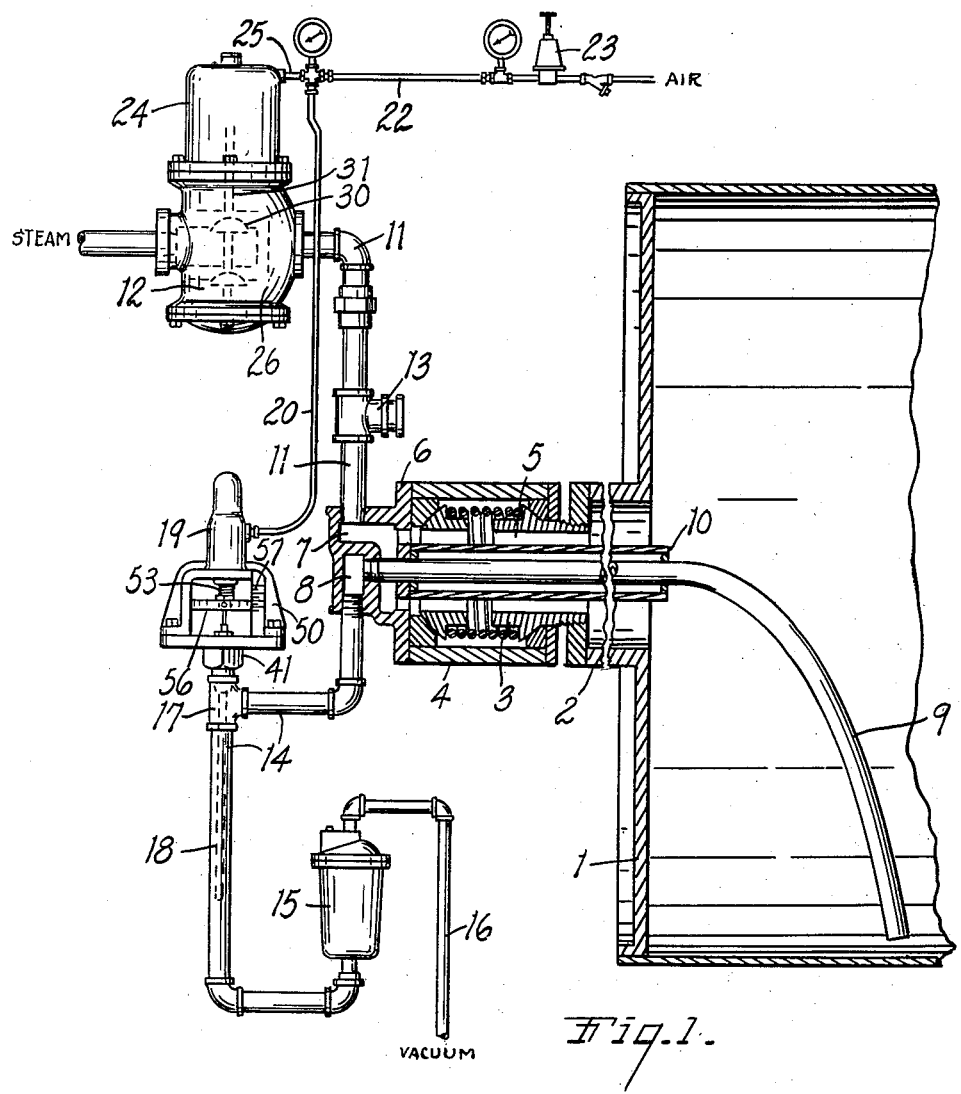
Fig. 1 is an elevational view of the control system with portions of the drier roll broken away in cross section.

Fig. 4 is an enlarged vertical cross sectional view through the valve shown in Fig. 3 and taken along the plane of the line 4—4 in Fig. 3.

Reference is made to my Patent No. 2,291,131, dated July 28, 1942 wherein is set out the desirability and basic principle of operation of my temperature control system. Generally the above patent discloses structure for mixing steam and air in varying proportions in an enclosure to be heated in order to regulate the temperature of the enclosure at the level corresponding to the partial pressure of the steam in the mixture. My present invention provides structure for more accurately controlling the proportion of air and steam admitted to an enclosure and for regulating this mixture of air and steam with inter-connected valves which are unlikely to become jammed or get out of adjustment.

In Fig. 1 I have illustrated a fragment of a drier roll 1 having a hollow rotatable hub 2. The hub is provided with a running seal 3 cooperative with the fixed portions of a hollow journal element 4. The particular structure of the running seal and journal element is unimportant to this invention so long as it provides a passage 5 into the interior of the drum.

Mounted on the end of the journal element 4 is a closure plate 6 forming an inlet passage 7 and an outlet passage 8. The inlet passage 7 opens through the passage 5 in the journal element to the interior of the drum and a siphon tube 9 extends from within the drum through the passage 5 to the outlet chamber 8. That portion of the siphon tube extending through the passage 5 and thus intimately associated with the inlet chamber 7 is insulated therefrom by the sleeve 10.

The inlet chamber 7 is supplied with a mixture of steam and air by the inlet pipe 11. Steam enters the pipe 11 through a throttling valve 12 and air enters the pipe 11 through a check valve 13.

The outlet chamber 8 discharges through a suction pipe 14 to a steam trap 15 under the influence of a vacuum supplied by the pipe 16. The discharge pipe 14 is provided with a T connection 17 through one arm of which the heat responsive bulb 18 of a thermostatic valve 19 enters the discharge pipe.

The thermostatic valve 19 is adjustable in a manner to be described in detail presently to control the pressure in an air line 20 by varying the escape of air from the line. Compressed air is supplied to the air line 20 through a restricted port 21 in the compressed air supply pipe 22. Pressure in the supply pipe 22 is maintained at a relatively constant value by means of the pressure regulator 23.

The steam throttling valve 12 is controlled and actuated by a differential pressure responsive device 24 in which one side of a collapsible bellows is subjected to the pressure of the throttled steam and in which the other side of the bellows is subjected to the air pressure within the air pipe 20 through a connecting pipe 25.

Referring in detail to the steam throttle valve 12 and differential pressure device 24 attention is called to Fig. 2 of the drawings. The throttle valve 12 comprises a suitable housing 26 forming a low pressure chamber 27 to which the pipe 11 is connected and a high pressure chamber 28 opening to the low pressure chamber through the opposed ports 29. The opening of the ports 29 is controlled by a pair of valve elements 30 mounted on a reciprocable valve rod 31 to form a balanced valve in which the pressure of the steam on the valve elements does not resist the movement of the valve in either direction.

The upper wall of the valve housing 26 forms an opening closed by the partition 32, the partition being held in place by the domed shape bellows housing 33. A corrugated collapsible bellows 34 is positioned within the bellows housing and has its lower open end sealed to the periphery of the partition 32 by means of a ring 35 and the partition 32 forms a small blend passage 36 affording communication between the low pressure steam chamber 27 and the interior of the bellows. The upper end of the valve rod 31 presses against the end plate 37 at the top of the bellows and a coil spring 38 compressed between the partition 32 and the abutment 39 on the valve rod constantly biases the bellows to extended position in which the valve elements 30 close the ports 29.

The bellows 34 is spaced from the walls of the bellows housing 24 so that the exterior of the bellows is subjected to the same pressure as exists within the air pipe 20 through the connecting pipe 245. It should thus be apparent that when the pressure in the air pipe 20 and the bellows housing 24 exceeds the combined pressure of the steam in the low pressure chamber 27 and the force of the spring 38 that the bellows will collapse forcing the valve rod 31 downwardly to open the valves 29—30. Additional high pressure steam will then enter the low pressure chamber 27 and pipe 11 until the pressure differential within the bellows and the bellows housing is eliminated.

The air valve 13 consists of a simple spring pressed ball check valve 40 spring pressed to closing position against the pressure of the atmosphere surrounding the valve. Thus the air valve will open when the pressure in the steam pipe 11 falls sufficiently below atmospheric pressure to overcome the spring bias on the check valve.

The details of air pressure control valve 19 are shown more clearly in Figs. 3 and 4. The valve consists of a nipple 41 threaded into the open arm of the T fitting 17. The inner end of the nipple 41 carries the sleeve 42 and the inner end of the sleeve communicates with and is closed by the bulb 18 filled with a suitable expansible liquid. Positioned within the sleeve 42 is a closed bellows 43 having its upper end sealed to the nipple 41 as at 44. The lower end of the bellows 43 is arranged to actuate a valve rod 45. The valve rod 45 extends upwardly through a packing nut 46 in the nipple and is spring biased downwardly to extend the bellows 43 by a coil spring 47.

Secured to the upper end of the nipple 41 as by the threaded connection 48 is a base plate 49 to the ends of which the arms of a yoke 50 are secured. The air valve 19 is formed in a housing 51 formed on the top of the yoke 50. The housing 51 forms the air chamber 52 to which the air pipe 20 is connected and a tubular seat element 53 is threaded into the valve body and opens to the chamber 52 co-axially with the valve rod 45. The valve member 54 cooperative with the tubular seat 53 is biased toward seating position by the coil spring 55 while the valve rod 45 extends through the tubular valve seat element to move the valve 54 off the seat under the influence of the bellows 43.

Secured to the lower end of the threaded seat element 53 and positioned between the arms of the yoke 50 is an adjusting disk 56 by means of which the seat element 53 may be moved toward or away from the valve member 54. A scale calibrated in terms of the temperature within the drum 1 is mounted on one arm of the yoke as at 57 so that the upper edge of the disk 56 serves as an indicating point cooperative with the scale. The periphery of the disk 56 is provided with a further micrometer scale 58 for indicating increments between the divisions on the scale 57.

From the foregoing description it should be apparent that the disk 56 and seat element 53 can be adjusted to any desired temperature indicated on the scales 57 and 58. Then with the air in the pipes 20 and 22 at a given pressure determined by the regulator 23 and with high pressure steam present in the chamber 28 of the throttling valve, the bellows 34 will be collapsed to open the throttle valves 30 and admit steam to the drum 1. When the drum is being initially heated from a cold temperature, the temperature in the suction pipe 14 will also be low and the bellows 44 will be expanded assuring that the valve 19 remains closed. Thus the full pressure in the air pipe 22 is exerted on the bellows 34 to hold the throttle valve open. Since the steam entering the pipe 11 is not throttled to a great extent, the air check valve 40 will remain closed and live steam will enter the drum 1.

As the pressure in the drum 1 increases with the addition of steam thereto, the temperature of the drum will also increase corresponding to the temperature of the steam. Eventually the drum will be filled with steam and steam and condensate will commence to be drawn through the siphon 9 and outlet pipe 14 past the bulb 18. As the temperature of the exhaust steam and condensate heats the bulb 18 the bellows 43 will be collapsed against the pressure of the spring 47 until the valve rod 45 lifts the valve member 54 from the seat element 53. Opening of the valve 54 reduces the air pressure in the pipe 20 and in the bellows housing 24 surrounding the bellows 34 so that the bellows 34 expands permitting the spring 38 to lift the valve rod 31 and close the throttle valves 30.

As heat is radiated from the drum 1 the steam in the drum will condense and be drawn out through the pipe 9. Condensing of the steam naturally reduces pressure in the drum and when the pressure falls below atmospheric pressure, the air check valve 40 will open permitting air to be mixed with the steam in the pipe 11 and within the drum. When the temperature of the mixture of air, condensate and steam falls below the predetermined level set by the adjustment of the disk 56 the bellows 44 will expand to close the valve 19. Closing of the valve 19 operates to build up air pressure in the housing 24 outside of the bellows 34 and opens the throttle valves 30 for the addition of more steam.

Attention is called to the fact that neither the throttle valve rod 31 or the air pressure valve rod 45 are subjected to extreme pressure differentials. Neither of the valve rods extends through a stuffing box requiring more than a loosely sliding fit so that both valves and valve rods are quick to respond to variations in the forces applied to them. My system is therefore extremely flexible and responsive to small temperature variations and will control the temperature within the drum within very close limits. Little power is required to operate the control system as a relatively small amount of compressed air will operate the differential bellows 34 and a vacuum equal to three or four inches of mercury is usually sufficient to lift the condensate from the bottom of the drum through the siphon tube 9 to the steam trap 15.

The importance and function of the air valves 13 in the system is most clearly understood by a consideration of the operation of the system at a temperature below 212° F. for operation of the system at these relatively lower temperatures, I make use of the familiar law of partial pressures in mixed gases. Assuming that the adjustable air control valve 19 is set corresponding to a temperature below 212° F. by adjustment of the disk 56 and valve seat 53, the throttling valve 12 will not open to admit steam to the cylinder in greater quantity or pressure than will maintain the temperature of the cylinder and the temperature responsive bulb 18 in the exhaust line at the predetermined temperature. Since the pre-selected temperature is below the temperature of steam at atmospheric pressure, condensation of the steam in the cylinder will tend to reduce the pressure or create a partial vacuum within the cylinder. However, as soon as the pressure falls below atmospheric, the check valve 13 will open to admit sufficient air to keep the pressure in the cylinder at approximately atmospheric pressure. The contents of the cylinder then consists of a mixture of air, steam and condensate with the partial pressure of the steam in the mixture corresponding to the preselected control temperature as determined by the air pressure control valve 19. The air check valve 13 functions automatically to replace any air carried out through the suction line 16 except, of course, when the system is adjusted to operate at a temperature above 212° F. At these elevated temperatures, the pressure of the steam within the cylinder will always be above atmospheric, and the cylinder will be completely filled with steam and condensate.

Having thus described my invention what I claim as new and desire to secure by Letters Patent is:

1. A temperature control system for controlling the temperature within an enclosure having a steam supply line and a suction outlet line communicating therewith comprising, a balanced throttle valve positioned in said steam supply line and having a reciprocable actuating rod, an air check valve opening to said steam supply line from the atmosphere between said throttle valve and said enclosure and biased to closed position against atmospheric pressure, a pressure differential bellows telescopically embracing and connected to the end of said throttle valve rod to control the movement thereof, said differential bellows being sealed to the housing of said throttle valve and open on the inside to the low pressure side of said throttle valve whereby throttled steam pressure biases said throttle valve toward closed position, an air pressure chamber formed around the outside of said differential bellows, means including a constantly open restricted port for supplying compressed air at selectively constant pressure to said air pressure chamber, an air outlet valve connected to said air pressure chamber to relieve the pressure therein, a pressure responsive bellows positioned adjacent to said air outlet valve, a second valve rod movable responsive to said pressure responsive bellows for moving said air outlet valve, a seat element for said air outlet valve adjustable axially of said second valve rod, a temperature scale calibrated in terms of temperature in said enclosure and associated with said seat, a sleeve positioned associated with said valve seat, a sleeve positioned bulb filled with thermally expansible fluid positioned in said suction line and communicating with the interior of said sleeve.

2. A temperature control system for controlling the temperature within an enclosure having a steam supply line and a suction outlet line communicating therewith comprising, a balanced throttle valve positioned in said steam supply line, an air check valve opening to said steam supply line from the atmosphere between said throttle valve and said enclosure and biased to closed position against atmospheric pressure, a pressure differential bellows telescopically embracing and connected to the end of said throttle valve to control the movement thereof, said differential bellows being sealed to the housing of said throttle valve and open on the inside to the low pressure side of said throttle valve whereby throttled steam pressure biases said throttle valve toward closed position, an air pressure chamber formed around the outside of said differential bellows, means including a constantly open restricted port for supplying compressed air at selectively constant pressure to said air pressure chamber, an air outlet valve connected to said air pressure chamber to relieve the pressure therein, a pressure responsive bellows positioned adjacent to said air outlet valve, a valve rod movable responsive to said pressure responsive bellows for moving said air outlet valve, a seat element for said air outlet valve adjustable axially of said valve rod, a sleeve positioned around said pressure responsive bellows, and a bulb filled with thermally expansible fluid positioned in said suction line and communicating with the interior of said sleeve.

3. A temperature control system for controlling the temperature within an enclosure having a steam supply line and a suction outlet line communicating therewith comprising, a balanced throttle valve positioned in said steam supply line, an air check valve opening to said steam supply line from the atmosphere between said throttle valve and said enclosure and biased to closed position against atmospheric pressure, a pressure differential bellows telescopically embracing and connected to said throttle valve to control the movement thereof, said differential bellows being open on the inside to the low pressure side of said throttle valve whereby throttled steam pressure biases said throttle valve toward closed position, an air pressure chamber formed around the outside of said differential bellows, a source of compressed air at selectively constant pressure communicating with said pressure chamber through a constantly open restricted port, an air outlet valve connected to said air pressure chamber to relieve the pressure therein, a temperature responsive bellows positioned in said suction outlet line, a valve rod movable responsive to said temperature responsive bellows for opening said air outlet valve upon increase in temperature of said temperature responsive bellows, and a seat element for said air outlet valve adjustable axially of said valve rod.

4. A temperature control system for controlling the temperature within an enclosure having a steam supply line and a suction outlet line communicating therewith comprising, a balanced throttle valve positioned in said steam supply line, an air check valve opening to said steam supply line from the atmosphere between said throttle valve and said enclosure and biased to closed position against atmospheric pressure, a pressure differential bellows connected to said throttle valve to control the movement thereof, said differential bellows being open on the inside to the low pressure side of said throttle valve, an air pressure chamber formed around the outside of said differential bellows, a source of compressed air at selectively constant pressure communicating with said pressure chamber, an air outlet valve connected to said air pressure chamber to relieve the pressure therein, a temperature responsive bellows positioned in said suction outlet line, a valve rod movable responsive to said temperature responsive bellows for opening said air outlet valve upon increase in temperature of said temperature responsive bellows, and a seat element for said air outlet valve adjustable axially of said valve rod.

5. A temperature control system for controlling the temperature within an enclosure having a steam supply line and a suction outlet line communicating therewith comprising, a balanced throttle valve positioned in said steam supply line, an air check valve opening to said steam supply line from the atmosphere between said throttle valve and said enclosure and biased to closed position against atmospheric pressure, a pressure differential bellows connected to said throttle valve to control the movement thereof, said differential bellows being open on the inside to the low pressure side of said throttle valve, an air pressure chamber formed around the outside of said differential bellows, an air outlet valve connected to said air pressure chamber to relieve the pressure therein, a bellows responsive to the temperature in said suction outlet line, a valve rod movable responsive to said temperature responsive bellows for moving said air outlet valve, a seat element and valve element for said air outlet valve, one of said elements being adjustable axially of said valve rod, and means for supplying compressed air at selectively constant pressure to said air chamber to replace air exhausted through said outlet valve.

References Cited in the file of this patent

UNITED STATES PATENTS

| Number | Name | Date |
|---|---|---|
| 616,575 | Jamer | Dec. 27, 1898 |
| 1,100,077 | Hornung | June 16, 1914 |
| 1,328,277 | Fulton | Jan. 20, 1920 |
| 1,434,542 | Horne | Nov. 7, 1922 |
| 1,585,732 | Otto | May 25, 1926 |
| 1,886,366 | Bailey | Nov. 8, 1932 |
| 1,965,823 | Burrell | July 10, 1934 |
| 2,003,585 | Dunham | June 4, 1935 |
| 2,041,544 | Hammond | May 19, 1936 |
| 2,366,801 | Olson | Jan. 9, 1945 |